W. E. SNEDIKER.
Improvement in Car Starters.
No. 133,265. Patented Nov. 19, 1872.
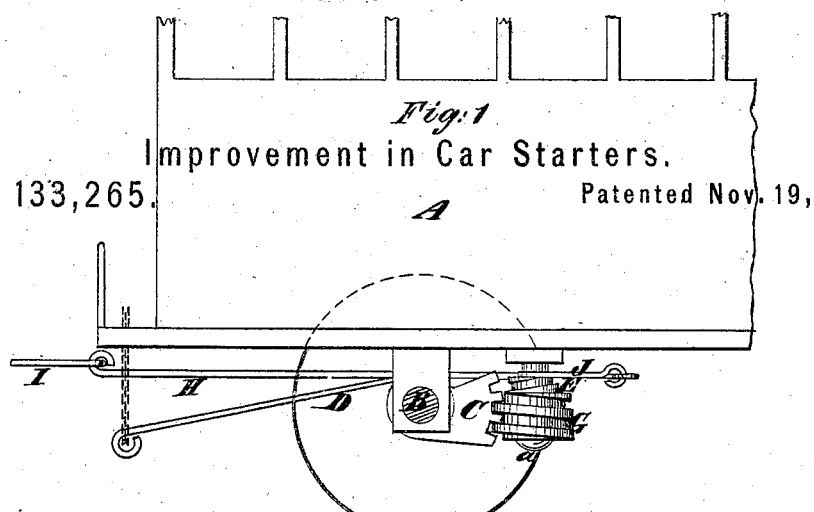
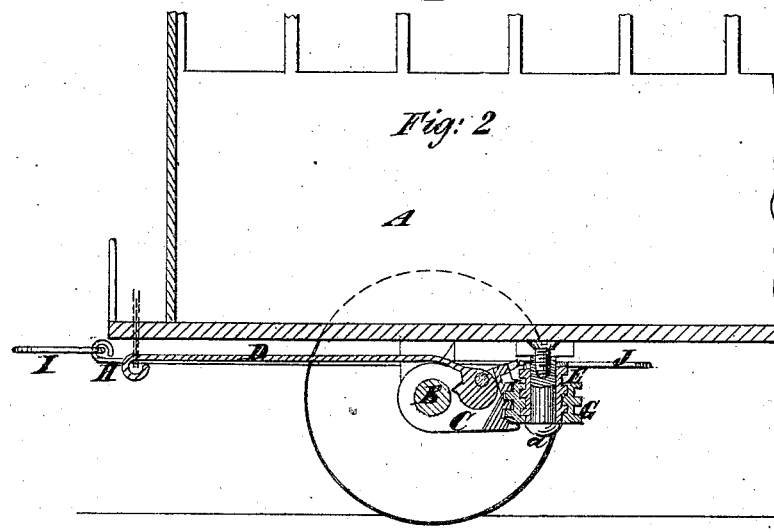
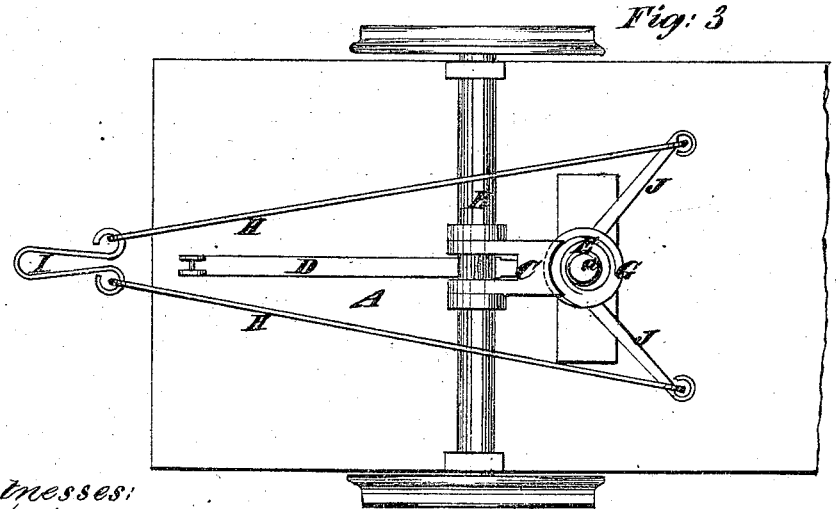
Witnesses:
Michael Ryan
Fred Hayter
W. E. Snediker

UNITED STATES PATENT OFFICE.

WILLIAM E. SNEDIKER, OF CHARLOTTEBURG, NEW JERSEY.

IMPROVEMENT IN CAR-STARTERS.

Specification forming part of Letters Patent No. 133,265, dated November 19, 1872.

*To all whom it may concern:*

Be it known that I, WILLIAM E. SNEDIKER, of Charlotteburg, in the county of Passaic and State of New Jersey, have invented an Improved Car-Starter, of which the following is a specification:

This invention consists in two screws, arranged to rotate one within another; a spirally-toothed sector, to which they, by their rotation, give motion; and a swinging pawl or tooth in said sector, the whole so arranged and combined with the axle of a car that the aforesaid pawl may be thrown into gear therewith, and by a direct pull on the screws the latter are rotated and move the sector, and so slightly turn the axle and wheels of the car.

In the accompanying drawing, Figure 1 is a side view of the fore portion of a car having my starter applied. Fig. 2 is a longitudinal section of the same, and Fig. 3 is an inverted plan thereof.

Similar letters of reference indicate corresponding parts in the several figures.

A represents the fore portion of a car, and B the fore axle of the same, which is furnished with wheels and secured to the body of the car in the usual manner. On the middle portion of this axle loosely fits the toothed sector C, which is bifurcated at the front and slotted or recessed in the upper side to receive the pawl or tooth D, before mentioned. The rear side of this device is arc-shaped and is concentric with the axle B. This side is made concave and has a series of spiral teeth or lugs formed on it to gear with the outer of two screws, E G. These screws, which screw one within the other, are pitched right and left, and are secured, by a stud, a, to the bottom of the car-body in such position that the outer shall gear with the sector. Each has an arm, J, secured to its upper end, and these arms are connected, by means of hounds or rods H, with a draft-link, I, by a pull on which the screws are rotated. The rotation of the inner screw within the outer raises it bodily, and the rotation of the latter itself raises the sector, and also communicates to it the motion produced by the rotation of the other screw. Thus considerable motion is given to the sector by mechanism taking up very little room. The pawl or tooth D consists of a strap having formed on it, opposite the axle, a tooth or projection. It is pivoted within the slot or recess in the upper side of the sector C, so that the tooth may be thrown into contact with the adjacent portion of the axle, and its forward end extends under the driver's platform, where it is suspended by a chain under control of the driver. The portion of the car-axle between the arms or bifurcations of the sector is roughened or serrated the better to facilitate the biting of the tooth or pawl D thereon. To operate the starter, the pawl D is lowered to bite the axle B, and so lock the sector to it. A pull on the hounds H H draws the arms J J forward and rotates the screws E G, thereby raising the sector C, and, consequently, turning the axle and wheels sufficiently to start the car. After the arms have reached the extent of their stroke the traction is the same as the ordinary method.

The great advantage of this starter is that no springs are used. It also is cheap and easily applied to any car. The same appliance may be arranged at each end of the car, or the same one may be made to do for both ends, so as to enable the car to be started from either end.

Claim.

The combination, with the axle of a car, of the screws E G, the spirally-toothed sector C, and the swinging pawl D, essentially as and for the purpose set forth.

W. E. SNEDIKER.

Witnesses:
 FRED. HAYNES,
 MICHAEL RYAN.